3,093,615
METHOD FOR IMPROVING THE DYE-RECEPTIVITY OF ARTICLES FORMED OF LINEAR ISOTACTIC POLYPROPYLENE

Alberto Bonvicini and Renzo Postal, Terni, Italy, assignors to Montecatini Societa Generale per l'Industria Mineraria e Chimica, Milan, Italy, a corporation of Italy
No Drawing. Filed Jan. 2, 1959, Ser. No. 784,437
Claims priority, application Italy Jan. 10, 1958
8 Claims. (Cl. 260—45.5)

This invention relates to the method for improving the dye-receptivity of articles, e.g., fibers, formed of linear head-to-tail propylene homopolymerizate consisting prevailingly of isotactic polypropylene.

It is known that the new linear, head-to-tail homopolymerizates of the alpha-olefins containing a high percentage of isotactic macromolecules, e.g., propylene homopolymerizates consisting prevailingly of isotactic polypropylene, have poor receptivity for the acid and basic dyes. This poor receptivity for the dyes is due, essentially, to the fact that those polymers of the alpha-olefins do not contain reactive groups capable of chemically bonding with substances of different chemical constitution.

The object of this invention is to provide a new method for improving the dye-receptivity of the linear alpha-olefin polymers.

This and other objects are accomplished by the invention in accordance with which we find that the dye-receptivity of the crystalline, isotactic polymeric alpha-olefins, and specifically of polypropylene containing a high proportion of isotactic macromolecules can be markedly improved by polymerizing isopropenylpyridines in the presence of polypropylene, thereby forming a graft copolymer. Isopropenylpyridine monomers can be polymerized in the presence of the polypropylene, thereby forming a graft-copolymer, before or after forming the alpha-olefins into shaped articles.

The isopropenylpyridines which can be polymerized in the presence of the linear polypropylene or the like include the 2-, 3-, and 4-isopropenylpyridines as well as those isopropenylpyridines containing methyl groups in the heterocyclic ring.

Polymerizing of isopropenylpyridine monomers in the presence of the polypropylene can be carried out in the liquid or gaseous phase, or in solution in a suitable solvent preferably in an oxygen-free medium, on fibers or other shaped articles of the polypropylene and with or without the prior introduction of peroxidic oxygen into the polypropylene.

The isopropenylpyridines can be used alone or in combination with other polymerizable monomers such as acrylonitrile, styrene, alkyl acrylates, alkyl methacrylates, e.g., methyl methacrylate, and the like, whereby graft-copolymers are formed from both isopropenylpyridine and the other monomer by polymerizing them in the presence of the polypropylene.

After the polymerization has been effected, the articles comprising, e.g., the graft-copolymer of polypropylene and isopropenylpyridine, is washed carefully with solvents capable of removing any unpolymerized monomer and any non-grafted homopolymer of the isopropenylpyridine adhering thereto and after drying can be dyed, particularly with acid and basic dyes, and then subjected to suitable finishing operations.

The following examples are given to illustrate the invention. It is to be understood that these examples are not intended as limiting.

Example 1

Five grams of staple fibers formed from a crystalline polypropylene containing isotactic macromolecules, having an intrinsic viscosity of 1.07, and containing 0.08% of —OOH groups, are suspended in a previously evacuated reactor containing a mixture of 50 grams freshly distilled 3-isopropenylpyridine and 50 grams methyl methacrylate and maintained at 80° C.

After 7 hours, the staple is discharged from the reactor, washed with 4% $H_2SO_4$ at 90° C. until the weight of the staple is constant, then washed with a boiling 1:1 mixture of benzene and acetone, and finally washed with ether. The dried staple shows a weight increase of about 7%.

Good dyeing results are obtained by dyeing the staple under the usual conditions with the following dyes:

Diacromo yellow RL (Mordant yellow 8, C.I. No. 18821)
Wool red B (Acid Red 115, C.I. No. 27200)
Alizarine blue ACF (Acid Blue 25, C.I. No. 62055)

Example 2

Five grams of a staple formed of the polypropylene of Example 1 and containing 0.08% of —OOH groups are introduced into a Carius tube, together with 50 grams of freshly distilled 2-isopropenylpyridine and 25 grams styrene.

The Carius tube is evacuated, then sealed over the flame and heated at 85° C. for 10 hours. It is then removed from the bath, cooled and opened. The staple is washed with 4% $H_2SO_4$ at 90° C., then with a 1:1 mixture of acetone and benzene, and finally with ether.

The dried staple showed a weight increase of about 4.3%.

Good dyeing results were obtained by dyeing the staple under conventional dyeing conditions with the following dyes:

Wool red B (Acid Red 115, supra)
Alizarine blue ACF (Acid Blue 25, supra)
Rosa setile BN (pink) (Disperse Red 15, C.I. No. 60710)

Isotactic macromolecules are linear, regular head-to-tail macromolecules which have substantially the isotactic structure characterized in that substantially all of the tertiary asymmetric carbon atoms of the successive monomeric units making up the same section of the main chain have the same steric configuration, and the main chain, if considered as fully extended in a hypothetical plane, shows the R groups (of the monomer formula $CH_2=CHR$ where R is hydrocarbon, e.g., a methyl group) of the same chain section on one side, e.g., above, of the plane and the H atoms attached to the tertiary carbon atoms of the monomeric units making up said chain section on the opposite side, e.g., below, of the plane. In an isotactic macromolecule, a chain section made up of monomeric units the R groups of which occur on one side of the hypothetical plane may be followed by a main chain section made up of monomeric units the R groups of which occur on the opposite side of the hypothetical plane. The starting alpha-olefin polymers of the present method consist prevailingly of the isotactic macromolecules. The starting material may be, for example, a crude propylene polymerizate less than 25% of which is extractable with boiling n-heptane and the non-extractable portion of which is composed of isotactic macromolecules as defined.

When it is desired to introduce peroxidic oxygen into the alpha-olefin polymer, e.g., polypropylene, prior to the graft-polymerization of the isopropenylpyridine or mixture thereof with other polymerizable vinyl monomers, the peroxidation may be accomplished by the methods disclosed, e.g., in the pending application of G. Natta et al. Ser. No. 600,718, now Patent No. 2,972,605, i.e. by treating the polypropylene or the like with molecular oxygen or an oxygen-containing gas in a solvent such as cumene and with or without the use of methanol as catalyst for the reaction which results in the introduction of hydroperoxide groups into the polypropylene chains. Shaped articles of the polypropylene can be superficially peroxidized by the method disclosed in the pending application of Natta et al., Ser. No. 643,915, now Patent No. 3,020,174, i.e., by exposing the articles to air or other oxygen-containing gaseous mixture at a temperature of 50 to 85° C.

The foregoing examples demonstrate the effectiveness of the isopropenylpyridine graft-copolymers in modifying the dye-receptivity of the polymeric alpha-olefins containing isotactic macromolecules. Various changes in details may be made in practicing the invention without departing from the spirit thereof and, therefore, we intend to include in the scope of the appended claims all such modifications and variations as may be apparent to those skilled in the art from the description and examples given herein.

The amount of isopropenylpyridine to be combined with the polymeric alpha-olefin is comprised in the range of from 1 to 25% of the polymer weight, according to the conditions of the process.

The useful amounts of isopropenyl-pyridine vary from 0.1 to 100 times the weight of the finished article.

The temperature for the polymerization is comprised between 80–90° C.

The percentage of peroxidic oxygen on the article, which allows an efficient grafting, is comprised between 0.01 gram and 1 gram per 100 grams weight of same article or, if the ratio surface/volume of same article is considered, between 0.01 and 0.1 gram/sq. m.

What is claimed is:

1. A process for increasing the dye-receptivity of articles formed of linear, head-to-tail propylene homopolymerizate consisting prevailingly of isotactic polypropylene, which process comprises forming graft-copolymers by polymerizing an alkenyl pyridine selected from the group consisting of 2-isopropenylpyridine, 3-isopropenylpyridine, 4-isopropenylpyridine, and methylisopropenylpyridine, in the presence of the polypropylene, said polymerization being effected by heating said article with said alkenyl pyridine at a temperature from about 80° to 90° C.

2. The process of claim 1 wherein the polymerization is effected while the alkenylpyridine is in the liquid phase.

3. The process of claim 1 wherein the polymerization is effected while the alkenylpyridine is in solution.

4. The process of claim 1 wherein the shaped article of polypropylene is heated with the alkenylpyridine and another polymerizable vinyl monomer selected from the group consisting of alkylacrylates, alkylmethacrylates, acrylonitrile and styrene.

5. A dye-receptive article of a graft copolymer of a linear propylene homopolymerizate consisting prevailingly of isotactic polypropylene and an alkenylpyridine selected from the group consisting of 2-isopropenylpyridine, 3-isopropenylpyridine, 4-isopropenylpyridine and methylisopropenylpyridine.

6. The article of claim 5 in fiber form.

7. A dye-receptive article of a graft copolymer of a linear polypropylene homopolymerizate consisting prevailingly of isotatic polypropylene, an alkenylpyridine selected from the group consisting of 2-isopropenylpyridine, 3-isopropenylpyridine, 4-isopropenylpyridine and methyl isopropenylpyridine, and a vinyl monomer selected from the group consisting of alkyl acrylates, alkylmethacrylates, acrylonitrile, and styrene.

8. The article of claim 7 in fiber form.

References Cited in the file of this patent

UNITED STATES PATENTS

| | | |
|---|---|---|
| 2,674,592 | Gluesenkamp et al. | Apr. 6, 1954 |
| 2,837,496 | Vandenberg | June 3, 1958 |
| 2,882,263 | Natta et al. | Apr. 14, 1959 |